US012068086B2

United States Patent
Johanson et al.

(10) Patent No.: US 12,068,086 B2
(45) Date of Patent: Aug. 20, 2024

(54) WELDED CONDUCTORS FOR POWER TRANSMISSION CABLES WELDED CONDUCTORS FOR POWER TRANSMISSION CABLES

(71) Applicant: NEXANS, Courbevoie (FR)

(72) Inventors: Audun Johanson, Oslo (NO); Jonas Larsson, Fredrikstad (NO)

(73) Assignee: NEXANS, Courbevoie (FR)

( * ) Notice: Subject to any disclaimer, the term of this patent is extended or adjusted under 35 U.S.C. 154(b) by 11 days.

(21) Appl. No.: 17/741,117

(22) Filed: May 10, 2022

(65) Prior Publication Data
US 2022/0359099 A1 Nov. 10, 2022

(30) Foreign Application Priority Data

May 10, 2021 (NO) .................................. 20210584

(51) Int. Cl.
*H01B 1/02* (2006.01)
*B23K 35/28* (2006.01)
*C22C 21/00* (2006.01)
*H01B 9/00* (2006.01)
*H01B 13/00* (2006.01)

(52) U.S. Cl.
CPC ........... *H01B 1/023* (2013.01); *B23K 35/288* (2013.01); *C22C 21/00* (2013.01); *H01B 9/006* (2013.01); *H01B 13/0036* (2013.01)

(58) Field of Classification Search
CPC . H01B 1/02; H01B 1/023; H01B 1/04; H01B 9/02; H01B 9/006; H01B 13/0036; B23K 35/288; C22C 21/00

USPC .................................. 174/74 R, 84 R, 88, 92
See application file for complete search history.

(56) References Cited

U.S. PATENT DOCUMENTS

| | | | | |
|---|---|---|---|---|
| 4,847,048 A * | 7/1989 | Nishi | ...................... | C22C 21/06 420/544 |
| 6,416,884 B1 * | 7/2002 | Haszler | ................ | B23K 35/288 420/545 |
| 6,440,583 B1 * | 8/2002 | Ueno | .................... | B23K 35/286 420/547 |
| 7,494,043 B2 * | 2/2009 | Mechsner | ............ | B23K 35/286 428/654 |
| 2012/0074111 A1 * | 3/2012 | Sasabe | .................... | C22C 21/02 219/137 R |
| 2016/0001403 A1 | 1/2016 | Matsumoto et al. | | |
| 2018/0247723 A1 * | 8/2018 | Hedlund | ................ | H01B 1/023 |
| 2022/0126367 A1 * | 4/2022 | Chehab | ................. | C22C 1/0416 |

OTHER PUBLICATIONS

Norwegian Search Report dated Dec. 10, 2021.
Norwegian Office Action dated Dec. 10, 2021.

* cited by examiner

*Primary Examiner* — William H. Mayo, III
(74) *Attorney, Agent, or Firm* — Sofer & Haroun, LLP

(57) ABSTRACT

An arrangement for welded conductors for power transmission cables includes conductors welded by a high conductive welding material. A method for production of such welded conductors and power transmission cables including the welded conductors includes joining the conductor elements by welding.

16 Claims, 2 Drawing Sheets

WELDED CONDUCTORS FOR POWER TRANSMISSION CABLES WELDED CONDUCTORS FOR POWER TRANSMISSION CABLES

RELATED APPLICATION

This application claims the benefit of priority from Norwegian Patent Application No. 2021 0584, filed on May 10, 2021, the entirety of which is incorporated by reference.

FIELD OF THE INVENTION

The present invention relates generally to the art of welded conductors for power transmission cables. More particularly, the invention concerns conductors welded by a high conductive welding material.

BACKGROUND

Power cables comprises one or more cores or conductors, usually disposed within outer layers of insulating materials. The wire and cable industry use a variety of metal/alloys for conductors, but the two most common are copper- and aluminum-alloys. Conductors based on copper or aluminum have different properties such as conductivity, tensile strength and density.

Using aluminum successfully is a matter of understanding the capabilities of this conductive metal and how to deal with the challenges it presence. Aluminum has lower electric conductivity compared to copper but is cheaper and has lower density.

Aluminum conductors have been found to be suitable for use in electrical cables and high voltage (HV) cables, i.e. cables adapted for voltages of 50 kV and above. HV-cables are used to transmit electrical power over long distances both on land and subsea. Normally, the long-distance power transmission cables are made by shorter conductors joined by welding.

In the aspect of welding conductors for power transmission cables, it is important that the welding material does not negatively affect the conductivity of the conductors to such extent that the joint significantly increases the local temperature due to resistive heating, while simultaneously showing similar strength and excellent weldability.

For instance, high conductivity normally implies high purity which in turn causes low fluidity during solidification of the welding joint which may lead to a non-desirable porosity of the joint. The addition of alloy elements to the aluminum-based welding material is critical and required to obtain a weldable material being less sensitive to mechanical force.

Thus, high weldability alloys are typically consistent with casting alloys where weld pool fluidity and suitable solidification range is achieved by adding relatively large amounts of alloying elements, such as silicon or magnesium. The problem associated with such high amounts of alloying elements is that the conductivity of the material is reduced which in turn can increase the temperature over the joints which then could compromise the insulation system.

Thus, the development of a welding material with a combination of high conductivity, strength and weldability is critical but also highly challenging.

There are publications reporting methods for production of aluminum-based welding materials and aluminum-based welding materials for welding of conductors for power transmission cables.

For instance, EP0539670 A2 discloses a method for producing a weld metal for use in welding of aluminum conductors wherein the welding material comprises silicon and aluminum.

EP3350812 B1 disclose conductors for power transmission cables wherein the conductors are welded by using a welding material alloy that comprises at least 85.2% by weight aluminum and from about 4.0% to 13.00% by weight silicon, or a welding material alloy that has an aluminum content of at least 99.5% by weight, a titan content of from 0.10% to 0.50% by weight.

Even though there are reports describing conductors for power transmission cables comprising welding joints. There is still an ever-existing need for further conductors for power transmission cables comprising welding joints comprising welding material wherein the welding material shows satisfactory weldability properties, has similar or improved tensile strength compared to the strength of the conductor elements and at the same time affecting the conductivity of the conductor negatively to a less extent compared to a welding material comprising relatively high amounts of Si or Mg.

OBJECTS AND SUMMARY

An object of the present invention to overcome one or more of the disadvantages of the prior art especially with regard to the conductivity and weldability of the welded joint.

It is also an object of the present invention to provide a welding material for joining two conductors having satisfactory weldability properties and a satisfactory conductivity.

In a first example aspect, the invention relates to a conductor for a power transmission cable comprising one or more joints provided by welding.

The inventors have studied AlZr alloys for use as welding material alloys to provide a welding joint that has satisfactory conductivity and weldability properties as well as a satisfactory mechanical strength for the installation and operation of a power transmission cable.

The experiments involved adding a predetermined amount of high purity zirconium to high purity aluminum for providing an AlZr alloy to be used as welding material for joining two conductor elements. The addition of zirconium to aluminum in the welding material alloy significantly improves the grain refinement of the welded joint which improves the plastic deformation and mechanical properties of the welded joint as it causes strengthening of the joint. However, experiments showed that the ratio between the amount of aluminum and zirconium played an important role especially for obtaining a satisfactory conductivity of the welded joint.

Hence, the conductor of the present invention comprises a first conductor element and a second conductor element connected by a welding joint. The welding joint comprises a welding material alloy consisting of at least 97% by weight aluminum (Al), from 0.1% to 1% by weight zirconium (Zr) and other metals and/or substances from 0 to 2.5% by weight, based on the total weight of the welding material alloy.

Compared to conventional welding material alloys such as the ones comprising high amounts of silicon or magnesium, the inventive AlZr welding material alloy has also shown improved conductivity properties making it better suited than conventional welding material alloys for joining conductor elements in a power transmission cable.

The welding material alloy may preferably comprise at least 98% by weight Al, more preferably between 98.5% and 99.6% by weight Al.

Further, the welding material alloy of the first example aspect may comprise from 0.25% to 0.8% by weight Zr, preferably from 0.4% to 0.7% by weight Zr, such as for example 0.6% by weight Zr.

The welding material alloy of the first example aspect may further comprise from 0 to 0.5% by weight titanium (Ti), preferably from 0.03% to 0.3% by weight Ti.

Both titanium and zirconium are known to be potent elements for grain refinement. The low solubility of titanium and zirconium in aluminum have multiple beneficial effects. Due to the low solubility, titanium and zirconium will form precipitates such as $Al_3Ti$, $Al_xZr$ or $TiB_2$ which will both serve as grain forming inoculants. By removing excess Ti and Zr from the matrix, the conductivity will also increase.

The welding material alloy of the first example aspect may also comprise from 0 to 0.1% by weight boron (B), preferably from 0.01% to 0.05% by weight B based on the total weight of the welding material alloy.

The addition of boron may scavenge impurities of inter alia transition elements from solid solution in the aluminum and form precipitates. Precipitates have a lesser detrimental effect on material conductivity compared to elements in solid solution. Precipitates also have a beneficial effect on grain refinement when they serve as nucleation sites. This is particularly the case for Titanium-Boride which is known to be a particularly potent grain refiner. This combination will as such both increase conductivity and weldability.

Further, the welding material alloy of the first example aspect may comprise from 0% to 0.05% by weight carbon (C), preferably from 0.005% to 0.015% by weight C.

Boron and carbon will for the same reasons as mentioned for titanium and zirconium enhance the conductivity of the joint.

Hence, the mentioned other metals and/or substances may advantageously be chosen from any one of titanium, boron and carbon. Preferably the mentioned other metals and/or substances comprises titanium. Even more preferably, the mentioned other materials or substances comprises titanium and one of boron or carbon. The ratio between titanium and boron or carbon can follow ratios found for other casting alloy systems such as a titanium to boron ratio of 5-1, or titanium to carbon ratio of 20-1.

The other metals and/or substances can further be chosen from at least one of silicon, iron, copper, manganese, magnesium, zinc, vanadium, scandium and chromium which can be actively added to the welding material alloy. In a preferred embodiment such other metals and/or substances are added in an amount up to 1% by weight based on the total weight of the welding material alloy.

The other metals and/or substances may additionally or alternatively comprise impurities in an amount of up to 1.5% by weight based on the total weight of the welding material alloy.

The welding material alloy may advantageously not comprise any nickel (Ni).

In an example aspect the welding material alloy may consists of:
97-99.8% by weight Al
0.1% to 1% by weight Zr
0 to 0.5% by weight Ti
0 to 0.1% by weight B
0 to 0.05% by weight C
0 to 2.5% other metals and/or substances.

In another example aspect the welding material alloy may comprise
97-99.6% by weight Al
0.1% to 1% by weight Zr
0 to 0.5% by weight Ti
0 to 0.1% by weight B
0 to 0.05% by weight C
0 to 1.5% other metals and/or substances.

In yet another example aspect the welding material alloy comprises 0.1% to 1% by weight zirconium, 0 to 0.5% by weight Ti, 0 to 0.1% by weight B, 0 to 0.05% by weight C, 0 to 2.5% other metals and/or substances and the remaining up to 100% is Al.

In yet another example aspect the welding material alloy comprises 0.25% to 0.8% by weight zirconium, 0.03% to 0.3% by weight Ti, 0 to 0.1% by weight B, 0 to 0.05% by weight C, 0 to 1.5% other metals and/or substances and the remaining up to 100% is Al.

In yet another example aspect the welding material alloy comprises 0.25% to 0.8% by weight zirconium, 0.03% to 0.5% by weight Ti, 0.05% to 0.1% by weight B, 0 to 0.05% by weight C, 0 to 1.5% other metals and/or substances and the remaining up to 100% is Al.

In yet another example aspect the welding material alloy comprises 0.25% to 0.8% by weight zirconium, 0.03% to 0.5% by weight Ti, 0 to 0.1% by weight B, 0.005% to 0.05% by weight C, 0 to 1.5% other metals and/or substances and the remaining up to 100% is Al.

In yet another example aspect the welding material alloy comprises 0.25% to 0.8% by weight zirconium, 0.03% to 0.5% by weight Ti, 0 to 0.1% by weight B, 0.005% to 0.05% by weight C, 0 to 1.5% other metals and/or substances and the remaining up to 100% is Al.

In yet another example aspect the welding material alloy comprises 0.4% to 0.7% by weight zirconium, 0.03% to 0.3% by weight Ti, 0 to 0.1% by weight B, 0 to 0.05% by weight C, 0 to 1.5% other metals and/or substances and the remaining up to 100% is Al.

In yet another example aspect the welding material alloy comprises 0.4% to 0.7% by weight zirconium, 0.03% to 0.5% by weight Ti, 0.05% to 0.1% by weight B, 0 to 0.05% by weight C, 0 to 1.5% other metals and/or substances and the remaining up to 100% is Al.

In yet another example aspect the welding material alloy comprises 0.4% to 0.7% by weight zirconium, 0.03% to 0.5% by weight Ti, 0 to 0.1% by weight B, 0.005% to 0.05% by weight C, 0 to 1.5% other metals and/or substances and the remaining up to 100% is Al.

In yet another example aspect the welding material alloy comprises 0.4% to 0.7% by weight zirconium, 0.03 to 0.5% by weight Ti, 0 to 0.1% by weight B, 0.005% to 0.05% by weight C, 0 to 1.5% other metals and/or substances and the remaining up to 100% is Al.

According to the first example aspect, the first conductor element and the second conductor element can be made of same metal material or of dissimilar metal materials. The metal material of the conductor element may preferably be selected from an aluminum alloy or a copper alloy.

The first and second conductor elements may be aluminum alloys selected from an alloy of any one of the Al 1000 series, Al 6000 series, Al 8000 series and an aluminum AlZr alloy.

A second example aspect of the present invention involves a power transmission cable comprising a conductor as disclosed above comprising at least to conductor elements, i.e. a first and second conductor element connected by a welding joint.

The invention further involves in a third example aspect a method for manufacture of a conductor for a power transmission cable.

The method may comprise the steps of:
providing a first conductor element and a second conductor element; and
joining the first conductor element and the second conductor element by welding, thereby obtaining the conductor, wherein the welding is performed by using a welding material alloy comprises at least 97% by weight Al, from 0.1% to 1% by weight Zr and other metals and/or substances from 0 to 2.5% by weight, based on the total weight of the welding material alloy.

The welding method can be chosen from at least one of metal inert gas welding and tungsten inert gas welding.

BRIEF DESCRIPTION OF DRAWINGS

Following drawings are appended to facilitate the understanding of the invention.

In the drawings, like reference numerals have been used to indicate like parts, elements or features unless otherwise explicitly stated or implicitly understood from the context.

DETAILED DESCRIPTION

In the following, embodiments of the invention will be described in more detail with reference to the drawings. However, it is specifically intended that the invention is not limited to the embodiments and illustrations contained herein but includes modified forms of the embodiments including portions of the embodiments and combinations of elements of different embodiments as come within the scope of the following claims.

Where a numeric limit or range is stated, the endpoints are included. Also, all values and subs ranges within a numerical limit or range are specifically included if explicitly written out.

Figure 1:
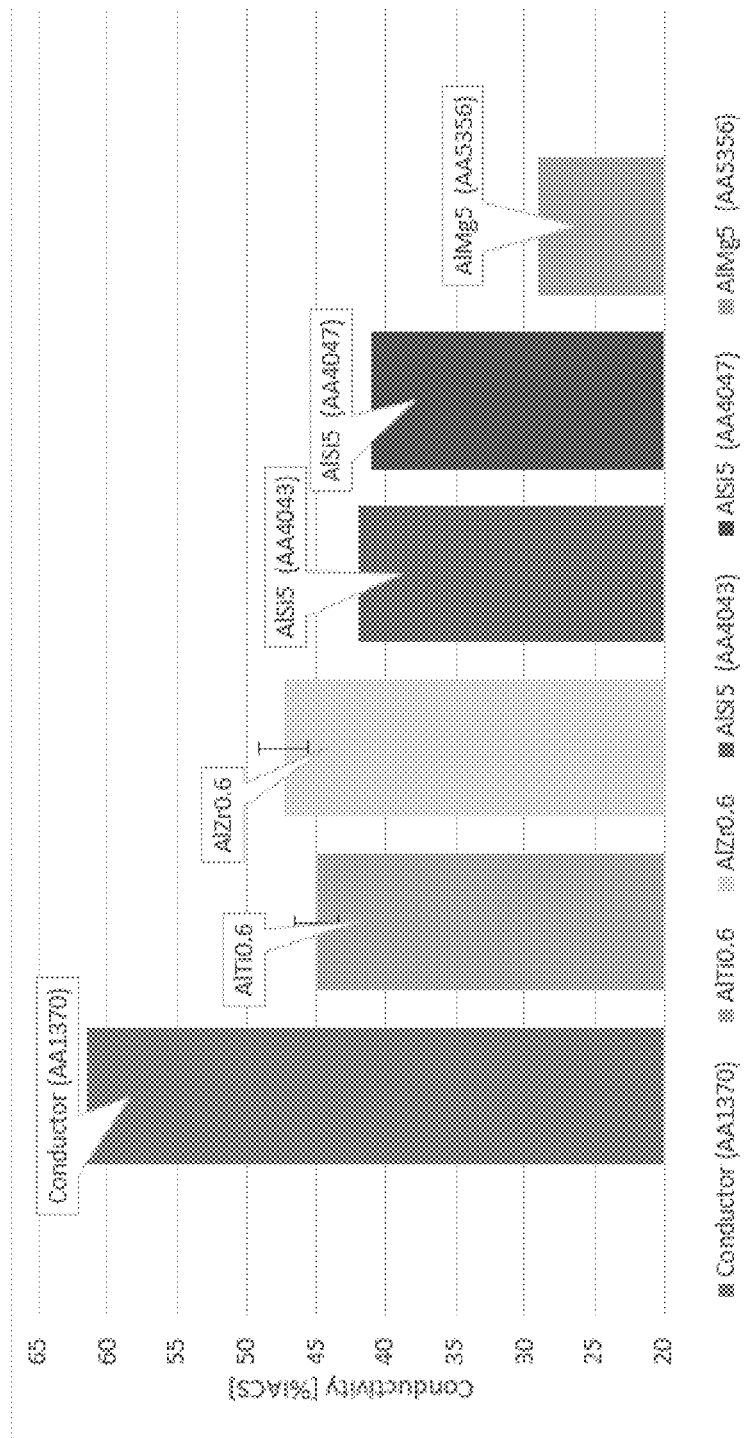
FIG. 1 shows a bar diagram of the conductivity of different welding material alloys including a conventional conductor element to be joined.

FIG. 1 shows a bar diagram comparing the conductivity of AlZr0.6, being an example welding material alloy according to the invention, to the conductivity conventional welding material alloys AlTi0.6, AlSi5 (AA4043, AA4047) and AlMg5 (AA5356), and a conventional conductor element (AA1370).

The conventional conductor element (AA1370) comprises a minimum of 99% by weight aluminum. The conventional aluminum alloy AlTi0.6 has a minimum of 99% by weight aluminum and 0.6% by weight Ti, while the conventional aluminum alloys AlSi5 (AA4043 and AA4047) comprising high content of silicon (5% by weight) and AlMg5 (AA5356) comprises a high content of magnesium (5% by weight).

The conductivity is measured as % IACS, which is according to the IEC 60468 standard. The bar diagram in FIG. 1 clearly demonstrates that AlZr0.6 welding material has better conductivity (% IACS of 47.3) and hence affects the conductivity of the conductor to a lower degree compared to the conventional welding materials comprising high amounts of silicon (% IACS of 41 and 42) or magnesium (% IACS of 29). It is also illustrated that AlZr0.6 has a higher conductivity than AlTi0.6 (% IACS of 44.9).

Hence, a welded conductor wherein welding material alloy comprises an Al content of at least 97% by weight and a zirconium content from 0.1% to 1% by weight and a content of other metals and/or substances of from 0 to 1% by weight have improved conductivity compared to conventional conductors comprising welded joint of conventional welding material alloys. Table 1 below shows an example embodiment of the welding material according to the invention.

TABLE 1

| Aluminum content [wt %] | >97 |
|---|---|
| Zr [wt %] | 0.1-1 |
| Other metal content [wt %] | Ti <0.5 |
| | B <0.10 |
| | C <0.05 |
| | Si <0.05 |
| | Fe <0.05 |
| | Cu <0.05 |
| | Mn <0.05 |
| | Mg <0.05 |
| | Zn <0.07 |
| | V <0.05 |
| | Sc <0.05 |
| | Cr <0.05 |

The welding material may be in forms of wires, rods, sticks or any suitable form of filler metal. Wires includes without limitations continuous wires intended for wire feeding applications used in for examples metal inert gas (MIG) welding. Welding material in forms of rods or sticks are used in for example tungsten inert gas (TIG) and stick welding. The welding material melts together with the conductor material during the welding process and thus forms a joint. Alternatively, the joint material is deposited as powder followed by re-melting by any alternative energy source.

Figure 2:
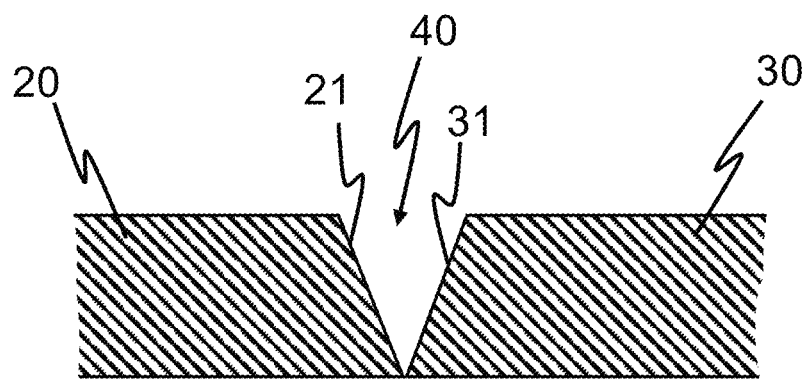
FIG. 2 illustrates a conductor prior to welding

The welding joint may be any type of joint including a V-joint as illustrated in FIG. 2.

A V-joint is a type of butt weld in which two metal conductor elements are joined in the same plane. The v-joint has at least one bevelled edge, and commonly two bevelled side edges, thus forming a V-shape. The v-joint may be a single v-joint or a double V-joint. V-joints are mechanically strong, requires minimum amount of welding material and are easy to process. A small joint comprising minimum amount of welding material thus affects the electrical properties of the conductor minimally.

The welding process used for obtaining the welding joint may be achieved by any suitable welding process known in the art, such as TIG welding or MIG welding. Alternatively, the welding joint can be achieved by any energy source to re-melt the welding rod such as a laser or electron beam.

Any of the above described welding processes may be used in welding conductors according to the present invention for use in power cables such as power transmission cables.

The conductors according to the present invention are intended for transmission of direct current (DC), but the conductors may also be for transmission of alternating current (AC). The conductors may be high voltage direct current (HVDC) or high voltage alternating current (HVAC) cables for use onshore or offshore.

Examples of preferred aluminum alloys of the conductor elements according to the invention are shown in table 2 below.

TABLE 2

| Alloy, % by weight. Total is always 100% | Alternative 1<br>1xxx series such as 1350/1370/1120 | Alternative 2<br>6xxx series such as 6101/6201 | Alternative 3<br>AlZr- alloy |
|---|---|---|---|
| Si | <0.20 | 0.3-0.7 | <0.20 |
| Fe | <0.45 | <0.5 | <0.5 |
| Cu | <0.20 | <0.1 | <0.1 |
| Mn | <0.02 | <0.03 | <0.03 |
| Mg | <0.10 | 0.35-0.90 | <0.10 |
| Cr | <0.02 | <0.03 | <0.03 |
| Zn | <0.10 | <0.10 | <0.10 |
| Ga | <0.05 | <0.05 | <0.05 |
| V + Ti | <0.03 | <0.03 | <0.03 |
| Ti | <0.03 | <0.10 | <0.10 |
| B | <0.07 | <0.07 | <0.07 |
| Zr | <0.05 | <0.05 | 0.1-0.7 |
| Other | <0.02 | <0.03 | <0.03 |
| Total | <0.1 | <0.1 | <0.1 |
| Al | >=99.5 | Rem. >=97.2 | Rem. >=97.8 |

The term "conductor element" can be interpreted as a standard conductor, a solid conductor, a profile wire conductor or a combination. The conductor can also be filled with a water blocking compound.

Each conductor element according to the invention may be of any length for example standard conductors may be from a few meters up to thousands of meters. A solid conductor according to the invention may in certain embodiments be a mechanical joint in form of a transition joint wherein friction welding has been conducted for connecting conductors of two different materials. The transition joint should be interpreted as a shorter conductor element compared to standard conductors. Examples of a transition joint that may be welded to a standard conductor element is disclosed in EP3261181 A1, cf. element 5 of FIGS. 2 and 3 and claims 1-17, incorporated herein by reference.

The invention also relates to a method for manufacture a conductor for a power transmission cable, as described above, comprising the steps:
 a. providing a first conductor element and a second conductor element; and
 b. joining the first conductor element and the second conductor element by welding, thereby obtaining the conductor, wherein the welding is performed by using a welding material alloy comprises at least 97% by weight Al, from 0.1% to 1% by weight Zr, other metals and/or substances from 0 to 1% by weight and unavoidable impurities from 0 to 1.5% by weight, based on the total weight of the welding material alloy.

The welding joint obtained between the first and the second conductor element may be any type of joint including a butt joint such as a X-joint, V-joint or U-joint. The final conductor may comprise a multiple of joints being selected from a multiple of different butt joints.

The welding process used for obtaining the welding joint may be achieved by any suitable welding process known in the art and as described above.

The power cable according to the invention may be a cable submerged in sea or fresh waters, submarine water cables or land cables.

To make a power transmission cable the conductors are normally surrounded by an electric insulation system to cover the conductor. An electric insulation system may comprise one or more insulation layers. The electrically insulating layer may be a polymer layer based on a crosslinked polyolefin, such as a crosslinked polyethylene (XLPE) or a crosslinked ethylene/propylene or ethylene/propylene/diene elastomer (EPDM). Alternatively, the insulation system may compromise layers of mass-impregnated paper.

Figure 3:
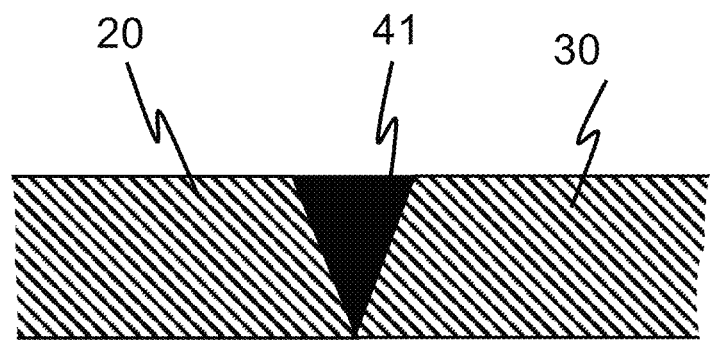
FIG. 3 illustrates the same conductor as FIG. 2 after welding.

FIG. 2 illustrates a conductor according to the present invention prior to welding while FIG. 3 illustrates the same conductor after welding.

The first electrical conductor 20 is shown having end portion 21 to be joined with end portion 31 of the second conductor 30 forming a V-shaped groove 40 therebetween which is to be filled by the welding material alloy.

FIG. 3 shows the same first and second conductor 20,30 of FIG. 2 after being joined together by welding material alloy 41.

Even if not shown in the figure, the first and second conductors a both parts of a first and second electrical HV-cable, respectively. Such HV-cables normally comprise an electrical insulation layer surrounding the conductor which has been partly removed at the end to allow for welding.

The material of the electrical insulation layers are chosen according to the conductor material of the electrical HV-cable.

After the welding has been completed and the first and second conductors have been joined, the joint and the parts of the first and second conductor being stripped from the insulating layer, hereinafter called joint-area, will be provided with an electrical insulation layer that covers and overlaps with the electrical insulation covering the first and second conductors.

Finally, the joint-area is provided with outer sheathing 38 covering the insulating cable thereby providing a one-piece HV-cable The outer sheath will normally comprise a plurality of different layers, but this is not part of the present invention and will not be described further. Other types of layers may also be included in the electrical cable.

The power cable can also be one of many elements such as multiple power cables, fiber optical cables or tubes bundled together in a single slender structure. Subsea power cables generally include one or more dedicated load bearing armoring elements in the shape of steel wires.

The invention claimed is:

1. A conductor for a power transmission cable, said conductor comprises:
 a first conductor element; and
 a second conductor element connected by a welding joint, wherein the welding joint has a welding material alloy, wherein the welding material alloy includes at least 97% by weight Al, from 0.4% to 0.7% by weight Zr and other metals and/or substances from 0 to 2.5% by weight, based on the total weight of the welding material alloy.

2. The conductor according to claim 1, wherein the welding material alloy comprises at least 98% by weight Al.

3. The conductor according to claim 2, wherein the welding material alloy comprises at least 98.5% to 99.6% by weight Al.

4. The conductor according to claim 1, wherein welding material alloy comprises from 0 to 0.5% by weight Ti.

5. The conductor according to claim 4, wherein welding material alloy comprises from 0.03% to 0.3% by weight Ti.

6. The conductor according to claim 1, wherein welding material alloy comprises from 0 to 0.1% by weight B based on the total weight of the welding material alloy.

7. The conductor according to claim 6, wherein welding material alloy comprises from 0.01% to 0.05% by weight B based on the total weight of the welding material alloy.

8. The conductor according to claim 1, wherein the welding material alloy comprises from 0 to 0.05% by weight C, preferably from 0.005% to 0.015% by weight C.

9. The conductor according to claim 8, wherein the other metals and/or substances is further chosen from at least one of Si, Fe, Cu, Mn, Mg, Zn, V, Sc and Cr.

10. The conductor according to claim 8, wherein the welding material alloy comprises from 0.005% to 0.015% by weight C.

11. The conductor according to claim 1, wherein other metals and/or substances comprises Ti and at least one of B and C.

12. The conductor according to claim 1, wherein the first conductor element and the second conductor element are made of same metal material or of dissimilar metal materials wherein the metal material(s) is selected from an aluminum alloy and a copper alloy.

13. The conductor according to claim 12, wherein the first and second conductor elements are aluminum alloys selected from an alloy of any one of the Al 1000 series, Al 6000 series, Al 8000 series and an aluminum Al—Zr alloy.

14. A power transmission cable comprising: the conductor according to claim 1.

15. A method for manufacture of a conductor for a power transmission cable according to claim 1, wherein the method comprises the steps of:
   providing a first conductor element and a second conductor element; and
   joining the first conductor element and the second conductor element by welding, thereby obtaining the conductor, wherein the welding is performed by using a welding material alloy including at least 97% by weight Al, from 0.4% to 0.7% by weight Zr and other metals and/or substances from 0 to 2.5% by weight, based on the total weight of the welding material alloy.

16. The method according to claim 15, wherein the welding method involves at least one of metal inert gas welding and tungsten inert gas welding.

* * * * *